March 14, 1939.  J. J. BYERS  2,150,360

SHIM FOR CAR TRUCKS

Filed Oct. 30, 1936  2 Sheets-Sheet 1

INVENTOR
Jacob J. Byers
BY
Clarence D. Kerr
ATTORNEY

March 14, 1939. J. J. BYERS 2,150,360
SHIM FOR CAR TRUCKS
Filed Oct. 30, 1936 2 Sheets-Sheet 2
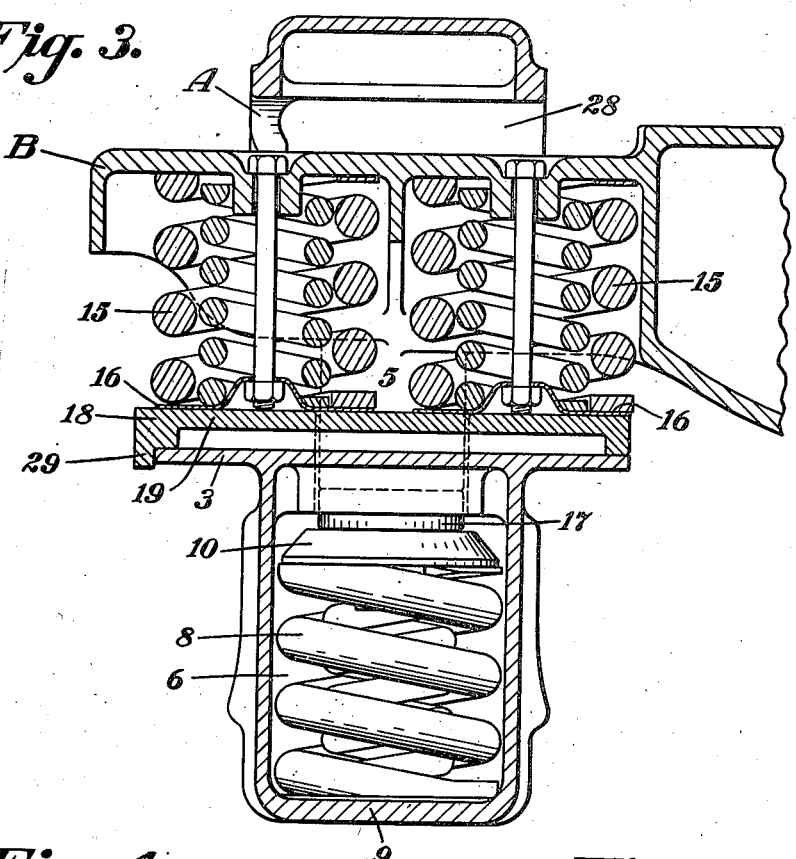
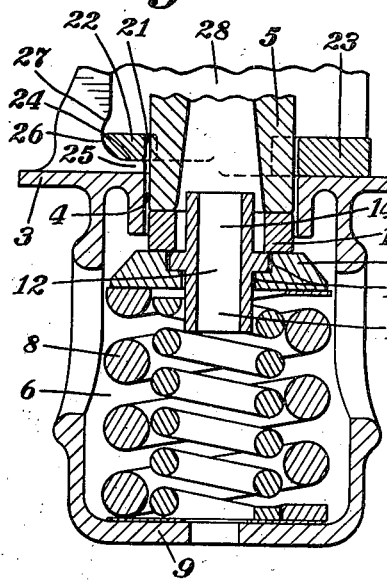
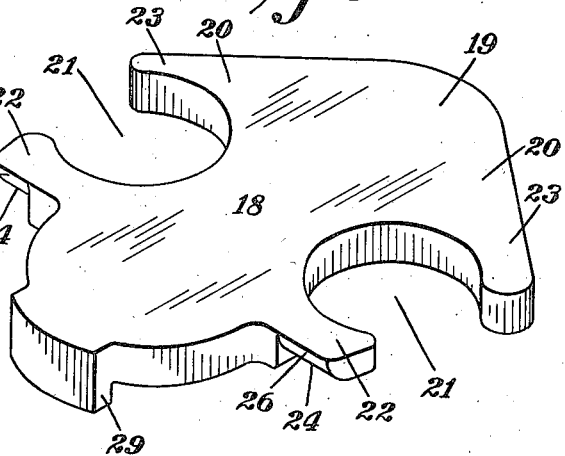
INVENTOR
Jacob J. Byers
BY
ATTORNEY Patented Mar. 14, 1939

2,150,360

UNITED STATES PATENT OFFICE 2,150,360

SHIM FOR CAR TRUCKS

Jacob J. Byers, Oakland, Calif., assignor to National Malleable and Steel Castings Company, Cleveland, Ohio, a corporation of Ohio Application October 30, 1936, Serial No. 108,443

8 Claims. (Cl. 105—197)

My invention relates to railway car trucks, and more particularly to the type of truck described in United States Patent No. 1,973,664, issued September 11, 1934, to James A. Shafer. This type of truck employs a plurality of sets of coil springs, or as an alternate a combination of coil springs and leaf springs, for the purpose of supporting the bolster. These springs, after a certain amount of use, are apt to acquire a permanent "set", or in other words, the expansive power of such springs weakens somewhat, and the bolster is thereby allowed to ride lower in the truck. This, of course, lowers the entire car frame and coupling mechanism, with the result that the latter is at times rendered difficult of manipulation. Under such circumstances it is desirable to "shim" the springs in order to overcome the effect described. The customary periodic turning down of the truck wheels to restore wheel contours also has the effect of lowering the coupler height, thereby making it advisable to shim the truck springs.

It is an object of my invention to provide improved means, both simple and efficient, for shimming the upper springs of the truck disclosed in the Shafer patent referred to above, and trucks similar thereto. Another object of my invention is to provide a shim which will maintain at all times the same degree of interlock between the bolster dowels and the side frame as exists in a truck of this type before any shimming has taken place. A further object of my invention is to provide a shim in one piece, instead of several, whereby it can be readily inserted in the truck as a unit. Other objects and advantages of my invention will be apparent from the description which follows.

In the accompanying drawings:

Figure 3 is a transverse vertical sectional view on the line 3—3 of Fig. 1.

Figure 4 is a fragmentary transverse vertical sectional view on the line 4—4 of Fig. 1; and Figure 5 is an isometric view of the shim constituting my invention.

Figure 1:
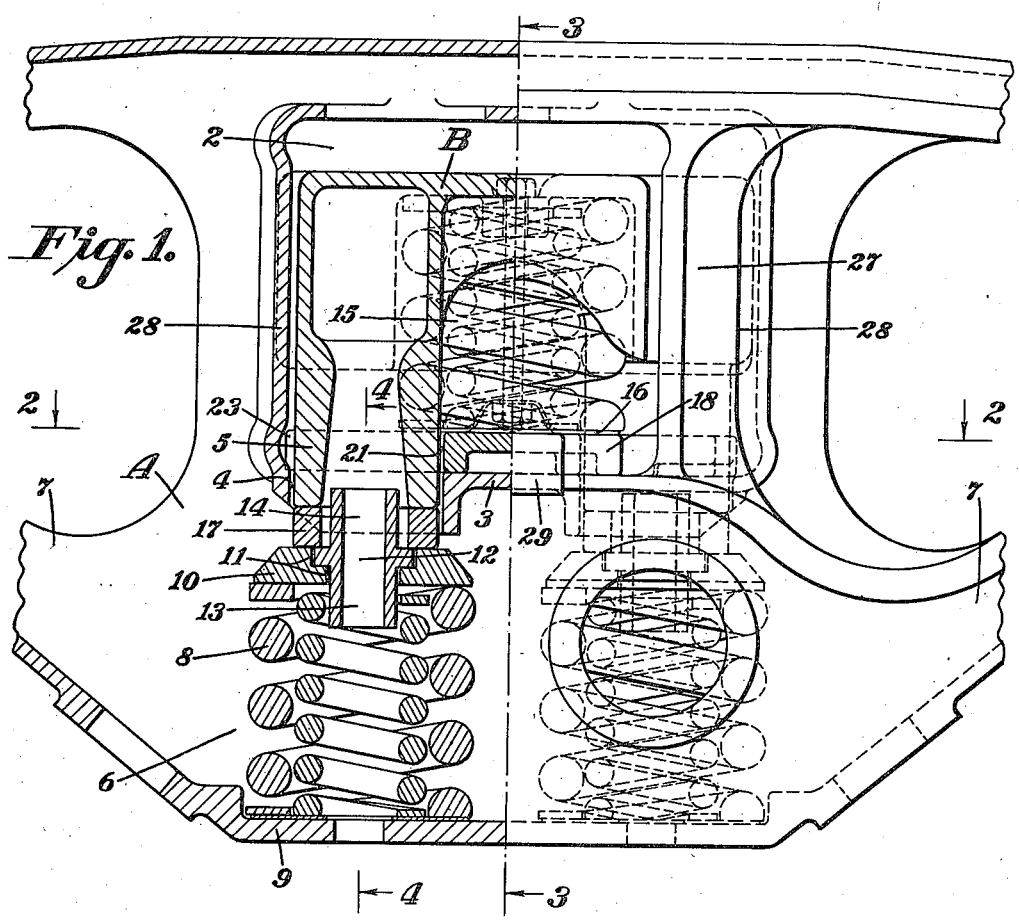
Figure 1 is a view partly in side elevation and partly in vertical section of a car truck embodying my invention.
Figure 2:
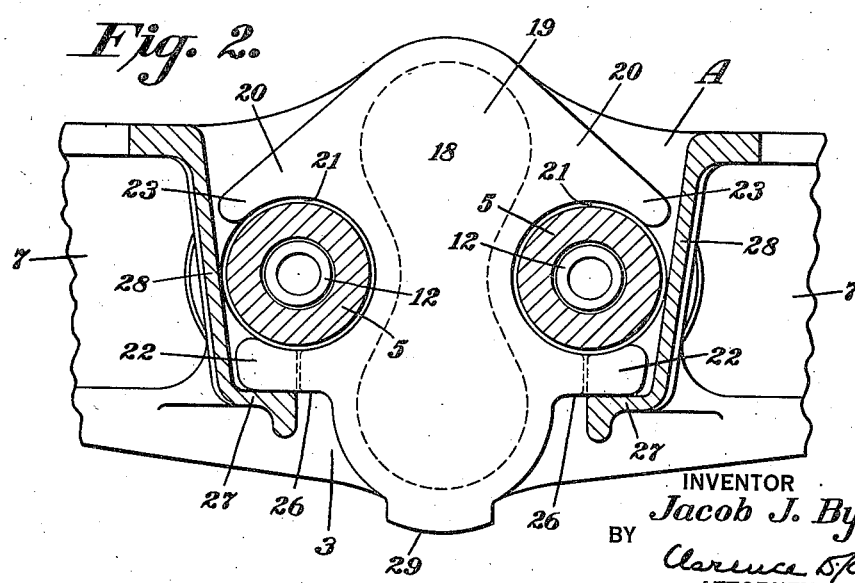
Figure 2 is a horizontal sectional view on the line 2—2 of Fig. 1.

Referring to the drawings, there is shown at A the central portion of a side frame of a car truck having a window 2 for the reception of a bolster B. It will, of course, be understood that the opposite end of the bolster extends into a similar side frame, but for the purposes of the present invention it will be sufficient to consider but one side frame and the associated end portion of the bolster. The side frame illustrated is of the type shown in the Shafer patent above referred to. The spring seat 3 forms the bottom of the bolster opening, and is provided with openings 4 through which the cylindrical lugs or dowels 5 of the bolster project into the interior of the tension portion 6 of the side frame, which is of box-section and merges with the side frame tension members 7. Coil springs 8 are mounted on the lower web or shelf 9 of the tension portion 6. Spring caps 10 are seated upon the upper ends of springs 8, and are provided with circular openings 11 centrally located, through which the spring cap studs 12 extend. Projections 13 of these studs extend downwardly into the interior of the coil springs 8, while the projections 14 extend upwardly into the interior of the bolster lugs 5.

Two sets of coil springs 15, 15 are arranged in tandem fashion within the bolster B, along the longitudinal axis of the latter, or in other words transversely of the side frame. Said springs 15 rest upon spring plates 16, which, in turn, ordinarily rest upon the spring seat 3. The bolster is carried by the upper springs 15 and the lower springs 8, the bolster lugs 5 ordinarily resting upon the spring caps 10. The side frame and bolster construction so far described is shown in the Shafer patent above referred to.

When it becomes advisable to shim the truck for any of the reasons previously mentioned, shims 17 are interposed between the spring caps 10 and the bolster lugs 5, while the shim 18, constituting my invention, is inserted between the spring seat 3 and the spring plates 16. Shims 17 are of the conventional type, as shown in Shafer Patent No. 2,062,682, granted December 1, 1936, being formed of metal discs of suitable thickness provided with central openings through which the projections 14 of the spring cap studs 12 project.

Referring more particularly to Fig. 4, it will be observed that when the shims 17 are interposed between the spring caps 10 and the bolster lugs 5, the extent of interlock between the latter and the side frame is reduced. In other words, the distance the bolster lugs project into the spring seat openings 4 is decreased by the amount of thickness of the shims 17. Inasmuch as this interlock constitutes the only means whereby the two side frames of the truck are tied together, it is highly important that it be maintained at all times. It is extremely desirable, therefore, that the original extent of this interlock be preserved when the truck is shimmed. It is with this idea in mind that I have designed my novel shim.

My shim 18 consists of a single plate of metal of the same thickness as the shims 17, and is formed with a central or spring seating portion 19, and laterally extending wing portions 20. The spring seating portion is recessed on its under side in order to lighten the casting, but sufficient bearing area is provided to safely transmit the spring load to the spring seat 3. Each wing portion is formed with an opening 21 in line with the openings 4 in the side frame spring seat 3. The walls of the openings 21 thereby form continuations of the walls of the openings 3.

The openings 21 divide each wing portion into a front projection 22 and a rear projection 23. The under surface of projection 22 is recessed, as at 24, to receive the upwardly offset portions or ledges 25 formed on the upper surface of the spring seat 3. These ledges 25 on the spring seat are contacted by the under surface of the bolster at such a point in its downward travel as to relieve the bolster springs of all oversolid blows. The front face of each projection 22 constitutes a shoulder 26 which is adapted to abut the flange 27 of the side frame columns 28, and in this manner prevents any outward lateral movement of the shim relative to the side frame. The central or spring seating portion of the shim is formed at its forward end with a downwardly extending projection or lip 29 adapted to overlap the front edge of the side frame spring seat 3, thereby locking the shim against inward lateral movement relative to the side frame. Thus, the engagement of shoulders 26 with the column flanges 27 and of lip 29 with the spring seat 3 effectively locks the shim in place on the spring seat, and prevents any appreciable movement thereof transversely of the side frame. It will be noted that the shoulders 26 and lip 29 are so positioned with respect to the shim openings 21 that the engagement of said shoulders and said lip with the column flanges and the spring seat automatically positions the shim openings in line with the spring seat openings 4 of the side frame.

When a car truck is initially placed in service no shims are present or necessary. However, as the use of the truck continues, the springs gradually lose a certain amount of their strength and resiliency, with a consequent lowering of the car frame. Also, after a certain length of time in service, the truck wheels will have to be turned down, thus affecting the height of the car frame. These effects must be compensated by shimming. To accomplish this operation in accordance with my invention the bolster is first raised in the bolster opening, by means of jacks, an amount sufficient to withdraw the bolster lugs 5 from the spring seat openings 4, thus permitting the bottoms of the bolster lugs to clear the spring seat 3. The side frame is then slipped off the end of the bolster. The shim 18 can then be readily inserted in the bolster opening 2 from the rear of the latter, and is moved so as to become locked in place on the spring seat by the engagement of shoulders 26 with flanges 27 and of lip 29 with the spring seat 3. The shims 17 for the lower springs are dropped through the spring seat openings 4 over the projections 14 of the studs 12 onto the spring caps 10. The bolster is then lowered to complete the operation. It will be apparent from an inspection of Fig. 4, that the walls of the shim openings 21, by reason of the interlock between the shim 18 and the side frame, form rigid continuations of the walls of the spring seat openings 4, and so compensate for the decrease in overlap between the bolster lugs and the walls of the spring seat openings resulting from the shimming operation.

From the above description it will be seen that I have invented a novel form of shim for car trucks, said shim being simple in construction and effective in operation. Furthermore, my shim may be readily inserted in place as a single unit, and is adapted to function as an additional interlock between the bolster lugs and the side frame.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A shim for a car truck comprising a spring supporting portion and laterally extending portions at each side of said spring supporting portion, each of said laterally extending portions having an opening therethrough, said shim being formed with a plurality of positioning shoulders spaced from said openings adapted to engage the associated side frame to lock said openings in a predetermined position with respect to said side frame.

2. In a car truck, a side frame having columns Z-shaped in cross-section forming a window opening, and a spring seat, said columns having flanges extending longitudinally of said side frame towards each other, a pair of openings in said spring seat, springs supported by said spring seat, and a bolster extending into said window opening and supported on said springs, said bolster having a lug extending into one of said openings, and a shim for said springs, said shim having a pair of openings therethrough and a plurality of shoulders spaced from said openings adapted to engage said flanges to position said shim openings in a predetermined position with respect to said spring seat openings.

3. In a car truck, a side frame having columns forming a window opening, and a spring seat, each column having a web, and a flange extending from said web toward the other column, a pair of openings in said spring seat, springs supported by said spring seat, a bolster extending into said window opening and supported on said springs, said bolster having a lug extending into one of said openings, and a shim for said springs, said shim having a pair of openings therethrough and being formed with a plurality of shoulders adapted to engage said flanges to prevent movement of said shim in one direction laterally of said side frame, and means on said shim laterally outwardly of said flanges adapted to engage said side frame to limit movement of said shim in another direction laterally of said side frame.

4. In a car truck, a side frame having a window opening and a spring seat, a pair of openings in said spring seat, springs supported by said spring seat, and a bolster extending into said window opening and supported on said springs, said bolster having a pair of lugs extending into said openings, and a shim for said springs, said shim having a pair of openings therethrough and a plurality of shoulders adapted to engage the side frame at laterally and longitudinally separated points spaced from said openings to position said shim openings in a predetermined position with respect to said spring seat openings, one of said points being on the lateral center line of said side frame.

5. In a car truck, a side frame having columns, a window opening and a spring seat, a pair of openings in said spring seat, springs supported by said spring seat, and a bolster extending into said window opening and supported on said springs, said bolster having a lug extending into one of said openings, and a shim for said springs, said shim having a pair of openings therethrough and a plurality of shoulders adapted to engage said columns to position said shim openings in line with said spring seat openings in one direction laterally of said side frame, and said shim having a downwardly extending lug engaging an outer surface of said spring seat to position said shim in the opposite direction laterally of said side frame.

6. In a car truck, a side frame having columns, a window opening and a spring seat, a pair of openings in said spring seat, springs supported by said spring seat, and a bolster extending into said window opening and supported on said springs, said bolster having a pair of lugs extending into said openings, and a shim for said springs, said shim having a pair of openings therethrough and a plurality of shoulders adapted to engage said columns and an outer surface on said spring seat to position said shim openings in line with said spring seat openings.

7. A shim for a car truck comprising a spring supporting portion and a laterally extending portion at each side of said spring supporting portion, each of said laterally extending portions having an opening therethrough, said spring supporting portion being formed with a depending lug spaced from said openings and adapted to engage the associated side frame to limit lateral movement of said shim in one direction with respect to said side frame, and said laterally extending portions being formed with shoulders adapted to engage said side frame to limit lateral movement of said shim in the other direction with respect to said side frame.

8. A shim for a car truck comprising a spring supporting portion and laterally extending portions at each side of said spring supporting portion, each of said laterally extending portions having an opening therethrough, said shim being formed with a plurality of positioning shoulders including a depending lug spaced from said openings and adapted to engage the associated side frame to lock said openings in a predetermined position with respect to said side frame.

JACOB J. BYERS.